US010358350B2

(12) United States Patent
Cumberland et al.

(10) Patent No.: US 10,358,350 B2
(45) Date of Patent: Jul. 23, 2019

(54) NANOMATERIAL HAVING TUNABLE INFRARED ABSORPTION CHARACTERISTICS AND ASSOCIATED METHOD OF MANUFACTURE

(71) Applicant: The Boeing Company, Chicago, IL (US)

(72) Inventors: Larken Elizabeth Cumberland, Agoura Hills, CA (US); Adam Franklin Gross, Santa Monica, CA (US); Keith John Davis, Seattle, WA (US); Nicole L. Abueg, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/631,595

(22) Filed: Jun. 23, 2017

(65) Prior Publication Data
US 2017/0291814 A1 Oct. 12, 2017

Related U.S. Application Data

(62) Division of application No. 14/505,013, filed on Oct. 2, 2014, now Pat. No. 9,764,952, which is a division of application No. 13/022,705, filed on Feb. 8, 2011, now Pat. No. 8,871,175.

(60) Provisional application No. 61/388,750, filed on Oct. 1, 2010.

(51) Int. Cl.
C01B 19/00 (2006.01)
B82Y 30/00 (2011.01)
B82Y 20/00 (2011.01)
B82Y 40/00 (2011.01)

(52) U.S. Cl.
CPC ............ *C01B 19/002* (2013.01); *B82Y 30/00* (2013.01); *C01B 19/007* (2013.01); *B82Y 20/00* (2013.01); *B82Y 40/00* (2013.01); *C01P 2002/60* (2013.01); *C01P 2002/72* (2013.01); *C01P 2002/82* (2013.01); *C01P 2004/64* (2013.01); *C01P 2006/40* (2013.01); *C01P 2006/60* (2013.01); *Y10S 977/773* (2013.01); *Y10S 977/774* (2013.01); *Y10S 977/775* (2013.01); *Y10S 977/776* (2013.01); *Y10S 977/84* (2013.01); *Y10T 428/2982* (2015.01)

(58) Field of Classification Search
CPC .............. C01B 19/002; C01P 2002/72; C01P 2002/82; C01P 2006/40; C01P 2006/60
USPC ........................................................ 423/508
See application file for complete search history.

(56) References Cited

U.S. PATENT DOCUMENTS

| 6,855,202 | B2 | 2/2005 | Alivisatos et al. |
| 7,172,791 | B2 | 2/2007 | Treadway et al. |
| 7,303,628 | B2 | 12/2007 | Alivisatos et al. |
| 7,311,774 | B2 | 12/2007 | Alivisatos et al. |
| 7,374,807 | B2 | 5/2008 | Parce et al. |
| 7,575,699 | B2 | 8/2009 | Strouse et al. |
| 7,588,828 | B2 | 9/2009 | Mushtaq et al. |
| 7,645,397 | B2 | 1/2010 | Parce et al. |
| 7,803,423 | B2 | 9/2010 | O'Brien et al. |
| 2008/0036101 | A1* | 2/2008 | Xiao ............... B82Y 30/00 257/681 |
| 2008/0112877 | A1 | 5/2008 | Xiao et al. |
| 2008/0237546 | A1 | 10/2008 | LoCasio et al. |
| 2009/0289233 | A1 | 11/2009 | Jang et al. |
| 2010/0003528 | A1 | 1/2010 | Rozhin et al. |
| 2012/0001356 | A1 | 1/2012 | Chang et al. |

FOREIGN PATENT DOCUMENTS

| CN | 101830445 A | | 9/2010 |
| WO | 2009/045177 | * | 4/2009 |
| WO | 2009/098248 | * | 8/2009 |

OTHER PUBLICATIONS

Arachchige et al., "Anomalous Band Gap Evolution from Band Inversion in PbSnTe Nanocrystals," *Nano Letters*, Mar. 24, 2009, vol. 9, No. 4, pp. 1583-1587.
Arachchige et al., "Supporting Information for Anomalous Band Gap Evolution from Band Inversion in $Pb_{1-x}Sn_x$Te Nanocrystals," [online] [retrieved Apr. 7, 2014]. Retrieved from the Internet: <http://pubs.acs.org/doi/suppl/10.1021/nl8037757/suppl_file/nl8037757_si_001.pdf>. 4 pages.
Jin et al., "Continuous Synthesis of SnTe Nanorods," *Journal of Materials Chemistry*, 2011, vol. 21, pp. 12218-12220.
Koike et al., "Molecular Beam Epitaxial Growth and Photoluminescence Characterization of Self-Organized $Pb_{1-x}Sn_x$Te Quantum Dots Embedded in a Single-Crystalline CdTe Host Matrix," *Applied Physics Letters*, 2007, vol. 91, pp. 181911-1 to 181911-3.
Kovalenko et al., "SnTe Nanocrystals: a New Example of Narrow-Gap Semiconductor Quantum Dots," *Journal of the American Chemical Society*, 2007, vol. 129, No. 37, pp. 11354-11355.
(Continued)

*Primary Examiner* — Steven J Bos
(74) *Attorney, Agent, or Firm* — Alston & Bird LLP

(57) ABSTRACT

A quantum nanomaterial having a bandgap that may be tuned to enable the quantum nanomaterial to detect IR radiation in selected regions including throughout the MWIR region and into the LWIR region is provided. The quantum nanomaterials may include tin telluride (SnTe) nanomaterials and/or lead tin telluride ($Pb_xSn_{1-x}$Te) nanomaterials. Additionally, a method of manufacturing nanomaterial that is tunable for detecting IR radiation in selected regions, such as throughout the MWIR region and into the LWIR region, is also provided.

10 Claims, 11 Drawing Sheets

(56) References Cited

OTHER PUBLICATIONS

Kovalenko et al., "Supporting Information for Synthesis of Monodisperse SnTe Nanocrystals: a New Example of Narrow Gap Semiconductor quantum Dots," [online] [retrieved Apr. 7, 2014]. Retrieved from the Internet: <http://pubs.acs.org/doi/suppl/10.1021/ja074481z/suppl_file/ja074481zsi20070819_092512.pdf>. 6 pages.

Kovalenko et al., "Quasi-Seeded Growth of Ligand-Tailored PbSe Nanocrystals through Cation-Exchange-Mediated Nucleation," *Angewandte Chemi International Edition*, Apr. 7, 2008, vol. 47, Issue 16, pp. 3029-3033.

Kovalenko et al., "Supporting Information for Quasi-Seeded Growth of Ligand-Tailored PbSe Nanocrystals through Cation-Exchange-Mediated Nucleation," [online] [retrieved Apr. 7, 2014]. Retrieved from the Internet: <http://www.wiley-vch.de/contents/jc_2002/2008/z705604_s.pdf>. 2008, 6 pages.

Pietryga et al., "Pushing the Band Gap Envelope: Mid-Infrared Emitting Colloidal PbSe Quantum Dots," *Journal of the American Chemical Society*, 2004, vol. 126, pp. 11752-11753.

Salavati-Niasari et al., "Simple Routes to Synthesis and Characterization of Nanosized Tin Telluride Compounds," *Applied Surface Science*, Nov. 2010, vol. 257, Issue 3, pp. 781-785.

Xu et al., "Supporting Information for Solution Synthesis and Optical Properties of SnTe Nanocrystals," *Crystal Growth & Design*, May 30, 2011, Retrieved from the Internet: URL: <http://pubs.acs.org/doi/suppl/10.1021/cg200660y/suppl_file?cg200660y_si_001.pdf> [retrieved Oct. 17, 2016].

Xu, Y. et al., *Supporting Information—Solution Synthesis and Optical Properties of SnTe Nanocrystals* [on line] [retrieved Jul. 24, 2017]. URL: <http://pubs.acs.org/doi/suppl/10.1021/cg200660y/suppl_file/cg200660y_si_001.pdf>. (dated May 30, 2011) 3 pages.

International Search Report and Written Opinion from corresponding International Appl. No. PCT/US2011/049755, dated Feb. 2, 2012.

Office Action for European Patent Application No. 11 758 005.0 dated Sep. 21, 2016, 5 pages.

Dimmock J.O. et al: "Band Structure and Laser Action in $Pb_xSn_{1-x}Te$", Physical Review Letters, vol. 16, No. 27, dated Jun. 27, 1966 pp. 1193-1196.

European Search Report received from corresponding International Appl. EP 17209967.3, dated Feb. 28, 2018.

\* cited by examiner

NANOMATERIAL HAVING TUNABLE INFRARED ABSORPTION CHARACTERISTICS AND ASSOCIATED METHOD OF MANUFACTURE

CROSS-REFERENCE TO A RELATED APPLICATIONS

This application is a divisional of U.S. patent application Ser. No. 14/505,013, filed Oct. 2, 2014, which is a divisional of U.S. patent application Ser. No. 13/022,705, filed Feb. 8, 2011, which claims the benefit of U.S. Provisional Application No. 61/388,750, filed Oct. 1, 2010, all of which are incorporated by reference herein in their entirety.

TECHNICAL FIELD

Embodiments of the present disclosure relate generally to nanomaterials and, more particularly, to nanomaterials having tunable infrared (IR) absorption characteristics as well as associated methods for manufacture of such nanomaterials.

BACKGROUND

In a number of applications, it is desirable to be able to detect IR signals. As such, a variety of IR sensors and coatings have been developed in order to collect and detect IR radiation. Typically, these IR sensors or coatings are designed to detect IR radiation within a specific bandwidth, such as within all or a portion of the near-infrared (NIR) bandwidth defined as 0.75-1.4 μm in wavelength, the short wavelength infrared (SWIR) bandwidth defined as 1.4-3 μm in wavelength, the mid-wavelength infrared (MWIR) bandwidth defined as 3-5 μm in wavelength, or the long-wavelength infrared (LWIR) bandwidth defined as 5-15 μm in wavelength.

Some IR detectors are formed of bulk semiconductor materials. The bulk semiconductor materials absorb infrared radiation at their bandgap. It is desirable in at least some applications to be able to tune the IR detector so as to detect a particular bandwidth of IR radiation. However, the bandwidth of the IR radiation that is absorbed by the bulk semiconductor materials can only be tuned by changing the composition of the semiconductor materials. As such, IR detectors that are formed of bulk semiconductor materials have typically been utilized to detect the NIR and SWIR bandwidths with few IR detectors formed of bulk semiconductor materials being constructed so as to detect IR radiation in the MWIR and/or LWIR bandwidths. However, IR detectors formed of a bulk $Hg_{1-x}Cd_xTe$ material have been utilized to detect IR radiation throughout the MWIR and LWIR regions as a result of its relatively low bandgap. Unfortunately, $Hg_{1-x}Cd_xTe$ has a relatively high toxicity level and may be quite expensive, thereby rendering it unsuitable for a number of applications and, in any event, posing at least some challenges during its manufacture and scalability.

As an alternative to the use of bulk semiconductor materials for IR detectors, quantum nanomaterials, such as quantum dots, quantum rods and nano-tetrapods, have been developed that are also capable of absorbing IR radiation. As such, IR detectors may incorporate quantum nanomaterials, i.e., dots, quantum rods or nano-tetrapods, or these materials may be incorporated into paints or other coatings such that the resulting paints or other coatings are sensitive to and capable of absorbing incident IR radiation. Quantum dots, quantum rods and nano-tetrapods have a bandgap that may be tuned by altering the size and morphology of the quantum dots, quantum rods and nano-tetrapods so as to correspondingly alter the region within the IR spectrum to which the quantum nanomaterials are sensitive. However, much of the prior development of nanomaterials such as quantum dots, quantum rods and nano-tetrapods that exhibit quantum confinement has been focused on achieving a relatively high quantum yield (QY) in which the nanomaterial efficiently absorbs and re-emits across the tunable bandgap with the nanomaterial system. Quantum dots, quantum rods and nano-tetrapods are therefore generally configured to absorb visible light, as well as IR radiation in the NIR and SWIR regions and, in some instances, a portion of the MWIR region, but have not generally been capable of absorbing the longer wavelength portion of the MWIR region or the LWIR region of IR radiation.

As such, it may be desirable to provide improved techniques for detecting IR radiation including, for example, improved techniques for detecting IR radiation throughout the MWIR region and into the LWIR region.

BRIEF SUMMARY

A quantum nanomaterial having a bandgap that may be tuned to enable the quantum nanomaterial to absorb IR radiation in selected regions including throughout the MWIR region and into the LWIR region is provided in accordance with one embodiment. Additionally, a method of manufacturing nanomaterial that is tunable for absorbing IR radiation in selected regions, such as throughout the MWIR region and into the LWIR region, is provided according to another embodiment.

A quantum nanomaterial is provided in accordance with one embodiment that includes at least one tin telluride (SnTe) nanocrystal having a cross-sectional dimension of between 15 nm and 50 nm. The SnTe nanocrystal of this embodiment has a bandgap between 0 eV and 0.35 eV dependent, at least partially, upon the cross-sectional dimensions of the SnTe nanocrystal. The SnTe nanocrystal of this embodiment also has peak absorption for signals having a wavelength of at least 3.5 μm. In one embodiment, the SnTe nanocrystal has peak absorption for signals having a wavelength of at least 4.2 μm and, in a further embodiment, for signals having a wavelength of at least 8 μm.

A quantum nanomaterial of another embodiment includes at least one lead tin telluride ($Pb_xSn_{1-x}Te$) nanocrystal in which x is a value between 0.1 and 0.6. The $Pb_xSn_{1-x}Te$ nanocrystal of this embodiment has a cross-sectional dimension of at least 7.5 nm. The $Pb_xSn_{1-x}Te$ nanocrystal also has a bandgap of between 0 eV and 0.35 eV dependent, at least partially, upon the cross-sectional dimensions of the $Pb_xSn_{1-x}Te$ nanocrystal and/or the value of x. The $Pb_xSn_{1-x}Te$ nanocrystal also has peak absorption for signals having a wavelength of at least 3.5 μm. In one embodiment, the $Pb_xSn_{1-x}Te$ nanocrystal has peak absorption for signals having a wavelength of at least 4.4 μm and, in a further embodiment, for signals having a wavelength of at least 8 μm.

In accordance with another embodiment, a method of manufacturing a tin telluride (SnTe) nanomaterial comprises mixing a tin (Sn) precursor solution and a telluride (Te) solution to form a solution. The solution is then maintained at an elevated temperature for a period of time. In accordance with this embodiment, additional amounts of the Sn precursor solution and the Te solution are repeatedly injected into the solution at different points in time following the initial mixing of the Sn precursor solution and the Te solution. Further, the solution is maintained at an elevated temperature for a period of time following the subsequent injection of an additional amount of the Sn precursor solution and the Te solution into the solution prior to the subsequent injection of an additional amount of the Sn precursor solution and the Te solution.

In one embodiment, the solution is cooled to an ambient temperature following a final injection of an additional amount of the Sn precursor solution and the Te solution. In this embodiment, the final injection may occur at least 30 minutes following the initial mixing of the Sn precursor solution and the Te solution. In one embodiment, for example, the final injection of an additional amount of the Sn precursor solution and the Te solution occurs at least 90 minutes following the initial mixing of the Sn precursor solution and the Te solution. By injecting the Sn precursor solution and the Te solution over time, larger nanomaterial may be grown to allow the absorption characteristics of the nanomaterial to be tuned to absorb longer IR wavelengths.

The injection of additional amounts of the Sn precursor solution and the Te solution also includes, in one example embodiment, injecting a lead (Pb) solution along with the additional amounts of the Sn precursor solution and the Te solution at at least one point in time. In one embodiment, for example, the initial mixing of the Sn precursor solution and the Te solution includes mixing the Sn precursor solution and the Te solution along with a Pb solution. In this embodiment, the injection of additional amounts of Sn precursor solution and the Te solution may also include injecting the additional amounts of the Sn precursor solution and the Te solution along with the Pb solution. By incorporating Pb into the nanomaterials, the bandwidth that the resulting nanomaterial is configured to absorb may also be tuned so as to detect longer wavelengths of IR radiation.

The method of one embodiment may also maintain the solution at an elevated temperature for a dwell time such as a dwell time of at least 15 minutes, following a final injection of the additional amounts of the Sn precursor solution and the Te solution. In regards to maintaining the mixture at an elevated temperature, the mixture may be maintained in accordance with one embodiment at a temperature of at least 140° C. during and following the injection of an additional amount of the Sn precursor solution and the Te solution. The elevated temperature and the incorporation of a dwell time may also facilitate tuning the absorption characteristics of the nanomaterial so as to detect longer IR wavelengths.

In accordance with another embodiment, a method of manufacturing a lead tin telluride ($Pb_xSn_{1-x}Te$) nanomaterial includes introducing lead into a container, such as by introducing a dried lead chloride solution into the container. The method of this embodiment also adds a tin (Sn) precursor solution and a telluride (Te) solution to the lead within the container to form a solution and then maintains the solution at an elevated temperature for a period of time prior to cooling to an ambient temperature to form the $Pb_xSn_{1-x}Te$ nanomaterial.

While adding the Sn precursor solution and the Te solution in accordance with one embodiment, the lead is maintained at the first elevated temperature. In this embodiment, the solution may be maintained at a second elevated temperature, less than the first elevated temperature, for a period of time after adding the Sn precursor solution and the Te solution. In one embodiment, maintaining the solution at an elevated temperature includes maintaining the mixture at at least 120° C. for the period of time after adding the Sn precursor solution and the Te solution. In one embodiment, maintaining the solution at an elevated temperature includes maintaining the solution at an elevated temperature for at least 90 seconds prior to cooling to the ambient temperature to form the $Pb_xSn_{1-x}Te$ nanomaterial.

In accordance with embodiments of the quantum nanomaterials and the method of manufacturing nanomaterial, quantum nanomaterials having a bandgap that is tunable to permit detection of higher wavelengths of IR radiation including, for example, IR radiation throughout the MWIR region and into the LWIR region, is provided. However, the features, functions and advantages that have been discussed may be achieved independently in various embodiments of the present disclosure and may be combined in yet other embodiments, further details of which may be seen with reference to the following description and drawings.

BRIEF DESCRIPTION OF THE SEVERAL VIEWS OF THE DRAWING(S)

Having thus described embodiments of the present disclosure in general terms, reference will now be made to the accompanying drawings, which are not necessarily drawn to scale, and wherein:

DETAILED DESCRIPTION

The present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

Figure 1:
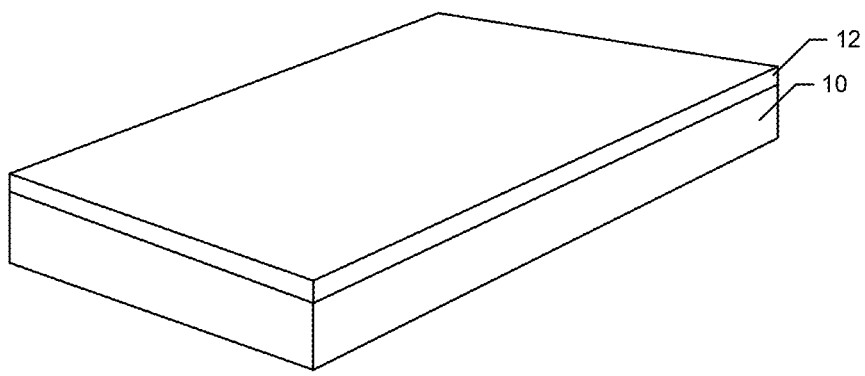
FIG. 1 is a perspective view of a surface having a coating including quantum nanomaterials in accordance with one embodiment to the present disclosure.

A quantum nanomaterial and an associated manufacturing process are disclosed according to embodiments of the present disclosure. The quantum nanomaterials may be utilized for a variety of purposes including the absorption of IR radiation. As such, the quantum nanomaterials may be included within an optical detector, device or other sensor for detecting IR radiation or at least a predefined bandwidth of the IR spectrum. Alternatively, the quantum nanomaterial may be formed in a solution and may be incorporated into paints or other coatings. In this regard, FIG. 1 illustrates a surface 10 and a coating 12 deposited upon the surface. The coating 12 of this example embodiment includes quantum nanomaterial that is responsive to a predefined bandwidth of the IR spectrum. Thus, the coating 12 may effectively absorb the predefined bandwidth of the IR spectrum as a result of the incorporation of the quantum nanomaterials therewithin.

The quantum nanomaterial may take the form of a quantum dot. Quantum dots form a potential well that confines carriers in three dimensions and produce quantized, discrete energy states resembling those in an atom. Changing the size and shape of a quantum dot alters the spacing of the energy levels and therefore effects interactions between the quantum dot and incident radiation. For example, a decrease in quantum dot size increases the quantum confinement and provides a smaller bandgap. Quantum dots may be synthesized utilizing a scalable solution synthesis. As part of the fabrication process, a surface and a shell or dopant of another material may be coated on or over the quantum dot to alter the light interaction properties and to improve environmental stability. Since quantum dots are soluble in the solution, quantum dots may be processed into a coating 12 utilizing relatively low-cost solution processing.

In accordance with an embodiment of the present disclosure, quantum nanomaterials may be fabricated such that the bandwidth of IR radiation to which the quantum nanomaterial is responsive may be advantageously tuned, such as to bandwidths throughout the MWIR region and, in one embodiment, into the LWIR region. In one embodiment, the quantum nanomaterial is formed of tin telluride (SnTe), while in another embodiment, the quantum nanomaterial is formed of lead tin telluride ($Pb_xSn_{1-x}Te$) in which x has a value between 0.1 and 0.6.

Figure 2:
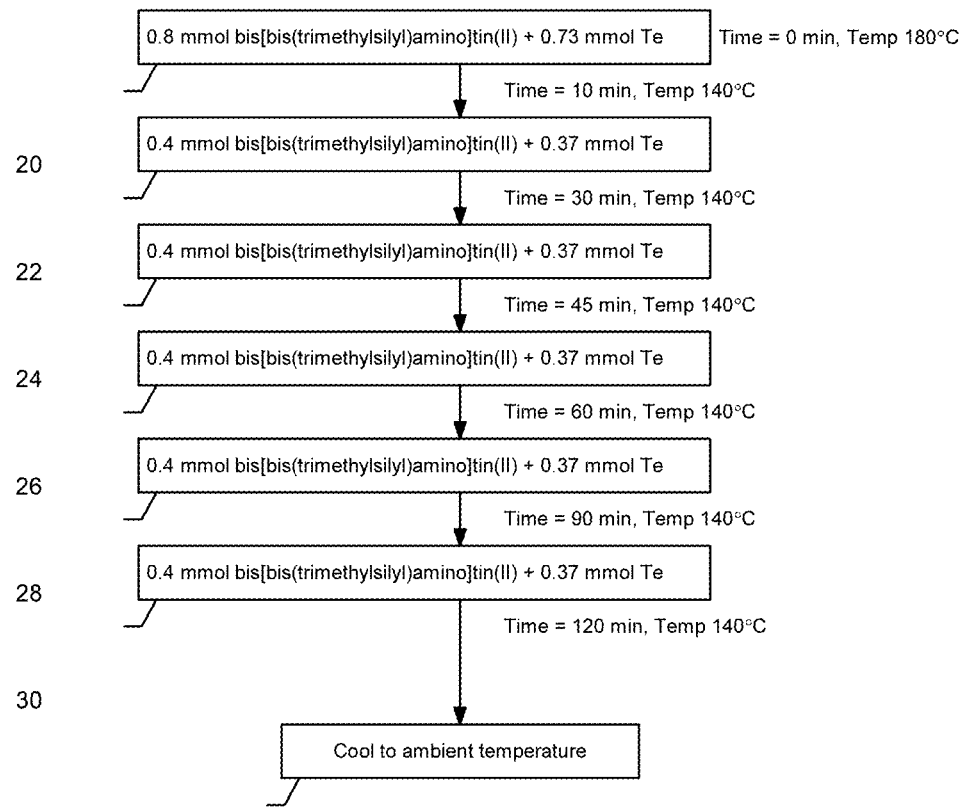
FIG. 2 is a flowchart illustrating operations performed in accordance with a method of one embodiment of the present disclosure.

In regards to a SnTe nanomaterial, the SnTe nanomaterial may be manufactured as shown, for example, in FIG. 2. In this regard, a tin (Sn) precursor solution and a tellurium (Te) solution may be initially mixed to form a solution. See operation 20 of FIG. 2. While the solution is maintained at an elevated temperature, that is, at a temperature greater than ambient or room temperature, additional amounts of the Sn precursor solution and the Te solution may be injected into the solution at a subsequent point in time. See operations 22-30 of FIG. 2. Following a dwell time and cooling to an ambient temperature as shown in operation 32, the solution may be processed to extract the SnTe nanomaterial. As a result of the injection of additional amounts of the Sn precursor solution and the Te solution as well as a result of the temperature at which the solution is maintained and the timing at which the injections of additional amounts of the Sn precursor solution and the Te solution are mixed, the bandwidth within the IR spectrum that the resulting SnTe nanomaterial is configured to absorb may be tuned including, for example, to bandwidths within the MWIR region and into the LWIR region.

Although the SnTe nanomaterial may be formed in various manners, a method of manufacturing the SnTe nanomaterial in accordance with one embodiment is shown in FIG. 2. In this embodiment, a Sn precursor solution and a Te solution are mixed at time 0 and at a predefined first elevated temperature, such as 180° C. See operation 20. Once the Sn precursor solution and the Te solution have been mixed, the temperature of the solution may be reduced to a second elevated temperature, such as to 140° C., and the initial solution may be held at this second predefined temperature for a first predetermined period of time, such as 10 minutes. Thereafter, an additional amount of the Sn precursor solution and the Te solution may be injected into the initial solution. See operation 22. The resulting solution may then be maintained at the second predetermined temperature for a second period of time, such as 20 minutes. A plurality of additional injections of the Sn precursor solution and the Te solution may then be introduced at different points in time to produce SnTe nanomaterial with a sufficiently broad bandgap, such as a bandgap between 0 eV and 0.35 eV. With reference to FIG. 2 by way of example, at 30 minutes following the initial mixing, another additional amount of the Sn precursor solution and the Te solution may be injected into the solution. See operation 24. As shown in FIG. 2, this repeated injection of an additional amount of the Sn precursor solution and the Te solution may be done at several different points in time, such as at 45 minutes, 60 minutes and 90 minutes following the initial mixing. See operation 30. In this regard, it is noted that the time references in FIG. 2 and the other flowcharts are elapsed time since the initial mixing. Following the final addition of the Sn precursor solution and the Te solution, the solution is maintained at the second elevated temperature for a predefined dwell time, such as 30 minutes, prior to allowing the solution to cool to room temperature. See operation 32. The resulting solution may then be further processed in order to obtain the SnTe nanomaterial.

In the illustrated embodiment, five additional injections of the Sn precursor solution and the Te solution are made following the initial solution of the Sn precursor solution and the Te solution. However, any number of additional injections of the Sn precursor solution and the Te solution may be made including four or fewer injections of additional amounts of the Sn precursor solution and the Te solution including or six or more injections of additional amounts of the Sn precursor solution and the Te solution. Additionally, while the injections occur at time increments of 15 and 20 minutes in the above described embodiment, other increments, such as between 5 and 30 minutes, may be established between injections in other embodiments. As will be described below in conjunction with FIGS. 3a and 3b, the injection of additional amounts of the Sn precursor solution and the Te solution causes the wavelength at which the resulting SnTe nanomaterial has its peak absorption to increase such as through the MWIR range and into the LWIR range in some embodiments.

The initial solution of the Sn precursor solution and the Te solution (operation 20) may be in the same proportion as all subsequent injections of additional amounts of the Sn precursor solution and the Te solution (operations 22-30). In one embodiment, however, the initial solution of the Sn precursor solution and the Te solution has a greater volume than any of the additional amounts of the Sn precursor solution and the Te solution that are thereafter injected into the solution. In this regard, the method of one embodiment injects the same additional amount of the Sn precursor solution and the Te solution at each of the different points in time. For example, the additional amounts of the Sn precursor solution and the Te solution injected at operations 22-30 may be between 40% and 60%, such as 50%, of the amounts of the Sn precursor solution and the Te solution that were initially mixed at operation 20. However, other proportions of the Sn precursor solution and the Te solution may be utilized in other embodiments.

In order to absorb longer wavelengths within the IR spectrum, the SnTe nanomaterial may be advantageously manufactured so as to have larger particles than those provided by conventional processes, such as nanocrystals having cross-sectional dimensions, such as diameters, of at least 15 nm and, in some embodiments, up to at least 50 nm. In order to grow larger SnTe nanomaterials, the method of manufacturing in accordance with one embodiment utilizes multiple injections of additional amounts of the Sn precursor solution and the Te solution over a longer period of time and, in one embodiment, at a higher temperature, such as exemplified by the embodiment of FIG. 2, than conventional techniques.

Although the method for manufacturing the SnTe nanomaterial may be performed in a variety of different manners, one example embodiment of the method is described hereinafter for purposes of illustration, but not of limitation. In this example method, a solvent, such as 1-octadecene (ODE) having a purity of 90%, was vacuum dried at 140° C. for two hours and stored in an argon filled glove box with bis[bis (trimethylsilyl)amino] tin (II), trioctylphosphine (TOP) having a purity of at least 90% and Te powder having a purity of about 99.99%. At 10 wt % solution of Te and TOP may then be prepared in a glove box by dissolving elemental Te in TOP at 200° C. for six hours. By utilizing TOP having a purity of about 90% as opposed to a higher purity, the resulting SnTe quantum dots were more monodispersed than if TOP having a purity of about 99% had been utilized.

A Sn precursor solution may then be formed in a glove box by dissolving 0.48 mL (1.2 mmol) of bis[bis(trimethylsilyl)amino] tin (II) in 9 mL of dry ODE and 9 mL of dry oleylamine (OLA) having a purity of about 70%. This solution may then be divided into 5 separate syringes containing 6 mL, 3 mL, 3 mL, 3 mL and 3 mL (0.8 mmol Sn for the 6 mL syringe and 0.4 mmol Sn for the 3 mL syringe). Additionally, 5 individual syringes may be loaded with 1 mL, 0.5 mL, 0.5 mL, 0.5 mL and 0.5 mL of the Te in 90% TOP solution (0.73 mmol Te for the 1 mL syringe and 0.37 mmol Te for the 0.5 mL syringe). Pairs of syringes containing the Sn precursor solution and the Te solution were then sealed in 1 L Nalgene bottles to prevent oxidation and removed from the glove box. As such, one Nalgene bottle contains one syringe of 6 mL of the Sn precursor solution and one syringe of 1 mL of the Te solution, while the other four bottles each contained one syringe of 3 mL of the Sn precursor solution and one syringe of 0.5 mL of the Te solution.

In accordance with this embodiment, a three neck 100 mL flask with a condenser column and septa on the side necks may then be attached to a vacuum/argon gas Schlenk line. 14 mL of an OLA solution may then be placed in the flask and vacuum dried at 100° C. for one hour. The flask may then be backfilled with argon and the syringe with 1 mL of the Te solution may then be injected. Once the reaction temperature is raised to a first elevated temperature, such as between about 150° C. and 180° C., the syringe containing 6 mL of the Sn precursor solution may be removed from the Nalgene bottle and injected into the flask while rapidly stirring the mixture within the flask. This initial injection into the flask is considered to occur at time 0. The temperature of the flask may then be allowed to decrease to a second elevated temperature, such as by being allowed to drop by 30° C. to 40° C. following the injection such that the reaction temperature is lowered to about 140° C. in one embodiment. As shown in operations 22, 24, 26 and 28 of FIG. 2, subsequent injections of the 3 mL Sn precursor solution and the 0.5 mL Te solution may be made at different points in time following the initial injection, such as at 10 minutes, 30 minutes, 45 minutes and 60 minutes following the initial injection. As shown at operation 30 in FIG. 2, an additional injection may be made at 90 minutes, however other embodiments may have only four additional injections such that operation 30 of FIG. 2 may be eliminated. Following the final injection, the resulting solution may be allowed to dwell for a dwell time, such as 30 minutes, at the second elevated temperature, such as 140° C. Thereafter, the heat may be removed from the flask, such as by removing a heating mantle that was previously heating the flask, and the solution may be allowed to cool to ambient temperature. See operation 32.

Thereafter, the SnTe nanomaterial may be precipitated. In one embodiment, 3 mL of oleic acid (OA) may be injected into the flask and then 10 mL of a 1:1 chloroform/acetone mixture may be added to the flask followed by additional acetone to cause precipitation of the quantum nanomaterial. The resulting solution may be centrifuged to separate the SnTe nanocrystals and the supernatant may be poured off with the SnTe nanocrystals being redissolved in chloroform. The precipitation, centrifugation and redissolution of the SnTe nanocrystals may be performed a plurality of times, such as 3 times, to increase the purity of the resulting SnTe nanocrystals.

Figure 3:
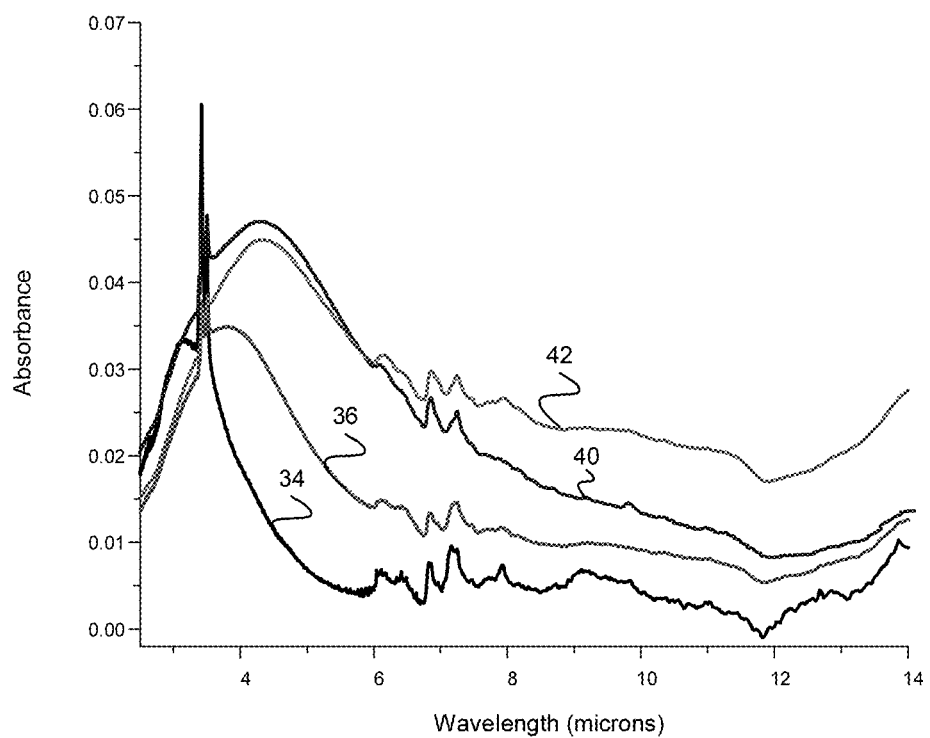
FIG. 3 is a graphical representations of the absorption spectrum of a SnTe nanomaterial manufactured with different numbers of repeated injections of additional amounts of an Sn precursor solution and a Te solution in accordance with one embodiment to the present disclosure.

As shown in FIG. 3, the absorption spectrum of the resulting SnTe nanomaterial varies based upon the wavelength of the incident IR radiation. In the embodiment described above and with additional amounts of the Sn precursor solution and the Te solution injected at 10 and 30 minutes following the initial mixing as shown in operations 22 and 24 of FIG. 2, the peak absorption of the absorption spectrum 36 of the resulting SnTe nanomaterial is about 3.7 μm as shown in FIG. 3. In this regard, the increase in peak absorption with an additional injection is represented by FIG. 3 in which the peak absorption of 3.1 μm that is occasioned by a single injection at 0 minutes (that is, during the initial mixing) is shown by absorption spectrum 34 relative to the peak absorption of 3.7 μm for absorption spectrum 36 that is attributable to injections at both 10 and 30 minutes following the initial mixing.

The wavelength at which the resulting SnTe nanocrystal has a peak absorption may be increased or shifted to the right relative to the graphical representation of FIG. 3 by additional injection(s) of the Sn precursor solution and the Te solution into the solution over time, such as at 45, 60 and 90 minutes following the initial mixing. See operations 26, 28 and 30 of FIG. 2. In this instance, the absorption spectrum 42 of the resulting SnTe nanomaterial that was formed with five additional injections at 10, 30, 45, 60 and 90 minutes has a peak absorption of IR radiation having a wavelength of about 4.4 μm, greater than the peak absorption of the absorption spectrums 34, 36 and 40 of the SnTe nanomaterial that was formed with zero, two and four additional injections, respectively. As this example illustrates, additional injections of the Sn precursor solution and the Te solution over time may further shift the wavelength at which the resulting SnTe nanomaterial has peak absorption to even greater wavelengths, such as through the MWIR region and, in some embodiments, into the LWIR region.

As noted above, the increase in the wavelength at which the SnTe nanomaterial has its peak absorption is based, at least in part, upon the growth of larger SnTe nanoparticles. In order to allow the resulting SnTe nanoparticles to grow larger, the method of manufacture may include a growth period, e.g., a dwell period, following the final injection of additional amounts of the Sn precursor solution and the Te solution at an elevated temperature, such as the second elevated temperature. In this regard, the method of the example embodiment described above maintained the solution at the second elevated temperature of 140° C. for a dwell time of 30 minutes. However, the method of other embodiments may have a growth time of other lengths following the final injection of an additional amount of the Sn precursor solution and the Te solution. In one embodiment, the growth time is greater than 10 minutes, such as at least 30 minutes in one embodiment which advantageously leads to red-shifted MWIR tunable nanomaterials that have a larger crystalline size. During the growth time, the SnTe nanoparticles are allowed to Oswald ripen into larger SnTe nanoparticles. However, the growth time should not be so long, such as greater than 120 minutes, so that the size distribution of the larger SnTe nanoparticles is lost.

Figure 4:
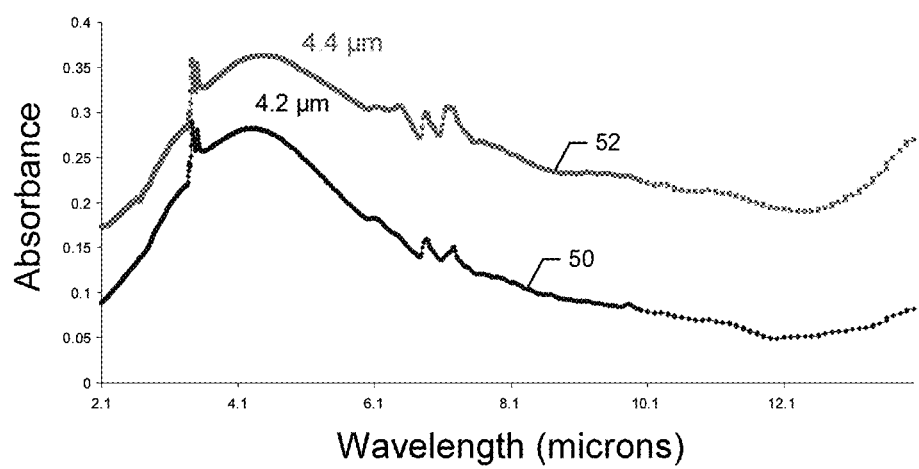
FIG. 4 is a graphical representation of the absorption spectrum of an undoped SnTe nanomaterial and a SnTe nanomaterial doped with Pb in accordance with one example embodiment of the present disclosure.
Figure 5:
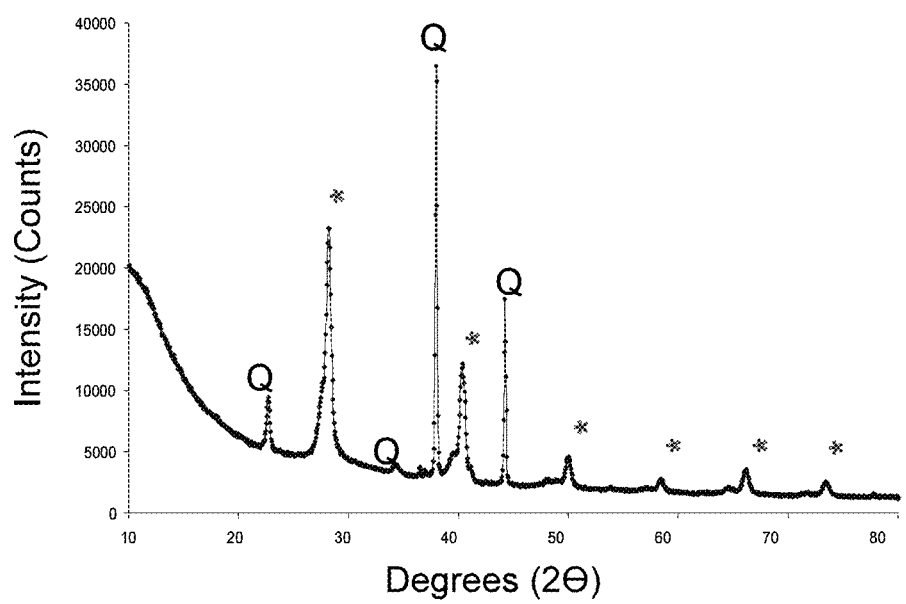
FIG. 5 is a graphical representation of the x-ray diffraction (XRD) spectrum of a SnTe nanomaterial doped with Pb in accordance with one example embodiment to the present disclosure.

The absorption spectrum of the SnTe nanomaterial may also be modified by doping the SnTe nanomaterial with lead (Pb). In this regard, doping the SnTe nanomaterial with Pb will also cause the wavelength at which the resulting nanomaterial has a peak absorption to increase, such as to greater wavelengths throughout the MWIR region or into the LWIR region. In order to absorb longer wavelengths within the IR spectrum, the PbSnTe nanomaterial may be advantageously manufactured so as to have larger particles than those provided by conventional processes, such as nanocrystals having cross-sectional dimensions, such as diameters, of at least 7.5 nm. The SnTe nanomaterial may be doped with lead by either growing the SnTe nanomaterial and then doping the resulting nanoparticles with Pb or by doping the SnTe nanomaterial with Pb during the growth of the nanomaterial. In an embodiment in which the SnTe nanomaterial is first grown and then is subsequently doped with Pb following its synthesis, the SnTe nanomaterial may be grown as described above. During the dwell time, however, concurrent with or following the final injection of an additional amount of the Sn precursor solution and the Te solution, Pb may be added to the mixture, such as by injecting a solution of lead chloride ($PbCl_2$) into the solution and then maintaining the solution at an elevated temperature, such as at the second elevated temperature of, for example, 140° C., for a period of time, such as 30 minutes. In the example embodiment described above, a solution of 56 mg of $PbCl_2$ in OLA which results in a 1:4 mol ratio of Pb:Sn precursors may be added to the solution with the solution then being held at the second elevated temperature of 140° C. for at least 10 minutes. By maintaining the solution at an elevated temperature for a period of time following the addition of the Pb, the Pb will partially anneal into the SnTe material system so as to shift the absorption spectrum to a longer wavelength in a controlled manner. In this regard, FIG. 4 illustrates the absorption spectrum 50 of an undoped SnTe material without Pb and the absorption spectrum 52 of a corresponding SnTe material that is doped with Pb. In this regard, FIG. 4 illustrates the absorption spectrum of an undoped SnTe material without Pb and a corresponding SnTe material that is doped with Pb. As will be seen, the peak absorption of the resulting SnTe nanomaterial is shifted from 4.2 micrometers for the undoped SnTe nanomaterial without Pb to 4.4 micrometers for the SnTe nanomaterial that is doped with Pb. Furthermore, the x-ray diffraction spectrum of the SnTe material doped with Pb is shown in FIG. 5. The peaks designated by an asterisk (*) indicate reflections that match to a $Pb_{0.5}Sn_{0.5}Te$ reference pattern, and are indicative of the incorporation of Pb into the SnTe quantum dot, such as by partial substitution. The peaks designated by Q are indicative of reflection from the quartz sample holder In an alternative embodiment, $Pb_xSn_{1-x}Te$ nanomaterials may be synthesized via a partial substitution reaction in situ during synthesis. In this regard, Pb may be initially introduced into a container, such as a flask, and an Sn precursor solution and a Te solution may be added to the Pb to form a solution. See operations 60 and 62 of FIG. 6. The resulting solution may then be maintained at an elevated temperature for a period of time, e.g., a dwell time, prior to cooling the solution to an ambient temperature to form the $Pb_xSn_{1-x}Te$ nanomaterial. See operation 64.

In one embodiment, OLA having a purity of about 70% may be vacuum-dried at 140° C. for two hours and then stored in an argon-filled glove box along with bis[bis(trimethylsilyl)amino] tin (II) top having a purity of about 90%, lead chloride having a purity of about 99.9%, and Te. Initially, the Sn precursor solution may be formed in a glove box by dissolving 0.16 ml (0.14 mmol) of bis[bis(trimethylsilyl)amino] tin (II) in 6 ml of dry ODE. This solution may be loaded into a 20 ml syringe with an 18 gauge needle. Additionally, 1 ml of Te in a TOP solution (0.73 mmol) may be loaded into a syringe. Both syringes may then be sealed in a 1 L Nalgene bottle to prevent oxidation when the syringes are moved from the glove box.

Figure 6:
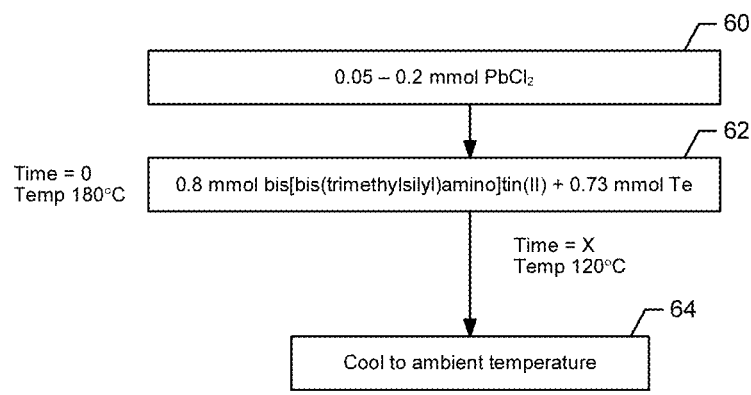
FIG. 6 is a flowchart illustrating the operations performed in accordance with a method of another embodiment of the present disclosure.

A three neck 100 ml flask with a condenser column and septa on the side necks may be attached to a vacuum/argon gas Schlenk line. 14 mL of the solution composed of OLA and 0.05-0.2 mmol of $PbCl_2$ may be placed in the flask and vacuum-dried at 100° C. for one hour, thereby having introduced lead into the flask as shown in operation 60 of FIG. 6. The flask may then be back-filled with argon, and the temperature may be raised to a first elevated temperature, such as 180° C. The Sn precursor syringe and the Te precursor syringe may then be removed from the Nalgene bottle and injected into the flask while the contents of the flask are rapidly stirred. The temperature of the flask may then be reduced to a second elevated temperature, such as 120° C., following injection of the Sn precursor solution and the Te solution, and the solution may then be maintained at the second elevated temperature for a predefined period of time (designated X in FIG. 6). For example, the mixture may be maintained at the second elevated temperature for at least 90 seconds, such as at least 11.5 minutes in one embodiment and at least 40 minutes in another embodiment.

Following maintenance of the solution at the second elevated temperature for a predefined period of time, the solution may be allowed to cool to ambient temperature, such as by removing the heating mantle that was previously heating the mixture. See operation 64. Thereafter, 3 ml of OA may be injected followed by the addition of 10 ml of a 1:1 chloroform/acetone mixture followed by the addition of additional acetone to cause precipitation of the $Pb_xSn_{1-x}Te$ quantum dots. The solution may then be centrifuged to separate the $Pb_xSn_{1-x}Te$ nanocrystals and the supernatant may be poured off with the nanocrystals thereafter being redissolved in chloroform. The precipitation, centrifugation and redissolution of the $Pb_xSn_{1-x}Te$ nanomaterials may be performed a plurality of times, such as three times, to increase the purity of the resulting nanocrystals.

Figure 7:
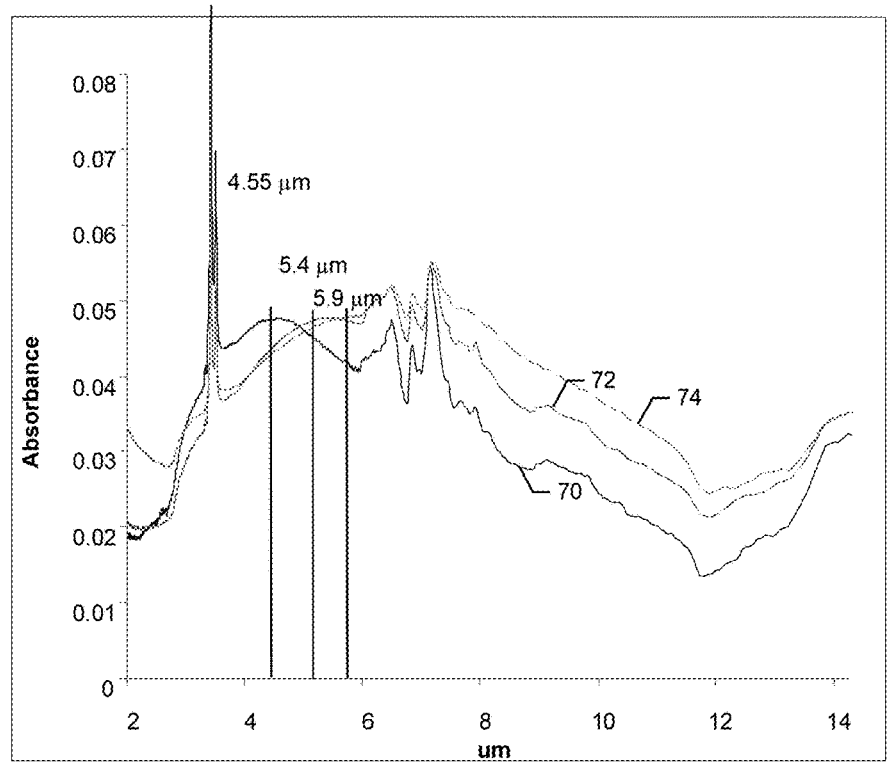
FIG. 7 is a graphical representation of the absorption of $Pb_xSn_{1-x}Te$ nanomaterial manufactured in accordance with a process having different dwell times according to one example embodiment of the present disclosure.

As noted above, the absorbance of a SnTe nanomaterial may be tuned by repeatedly injecting additional amounts of the Sn precursor solution and the Te solution over time and by the doping of the SnTe nanomaterial with Pb. The absorbance may also be tuned by controlling the length of the dwell time with increased absorbance at higher wavelengths attributable to the larger particle growth associated with longer dwell times, such as from 1 minute to 60 minutes. In this regard, FIG. 7 provides a graphical representation of the absorbance of various wavelengths within the IR spectrum of $Pb_xSn_{1-x}Te$ nanomaterials that were manufactured with dwell times of 1.5 minutes, 11.5 minutes and 40 minutes (absorbance spectra 70, 72 and 74, respectively). As shown, the exciton peak of the $Pb_xSn_{1-x}Te$ nanomaterial may be shifted to greater wavelengths as the $Pb_xSn_{1-x}Te$ nanomaterial is manufactured with longer dwell times is annealed for longer periods of time. In this regard, the exciton peak for $Pb_xSn_{1-x}Te$ nanomaterial that had a dwell time of 1.5 minutes is at about 4.55 microns, the exciton peak for $Pb_xSn_{1-x}Te$ nanomaterial that had a dwell time of 1.5 minutes is at about 5.4 microns, and the exciton peak for $Pb_xSn_{1-x}Te$ nanomaterial that had a dwell time of 1.5 minutes is at about 5.9 microns.

Figure 8:
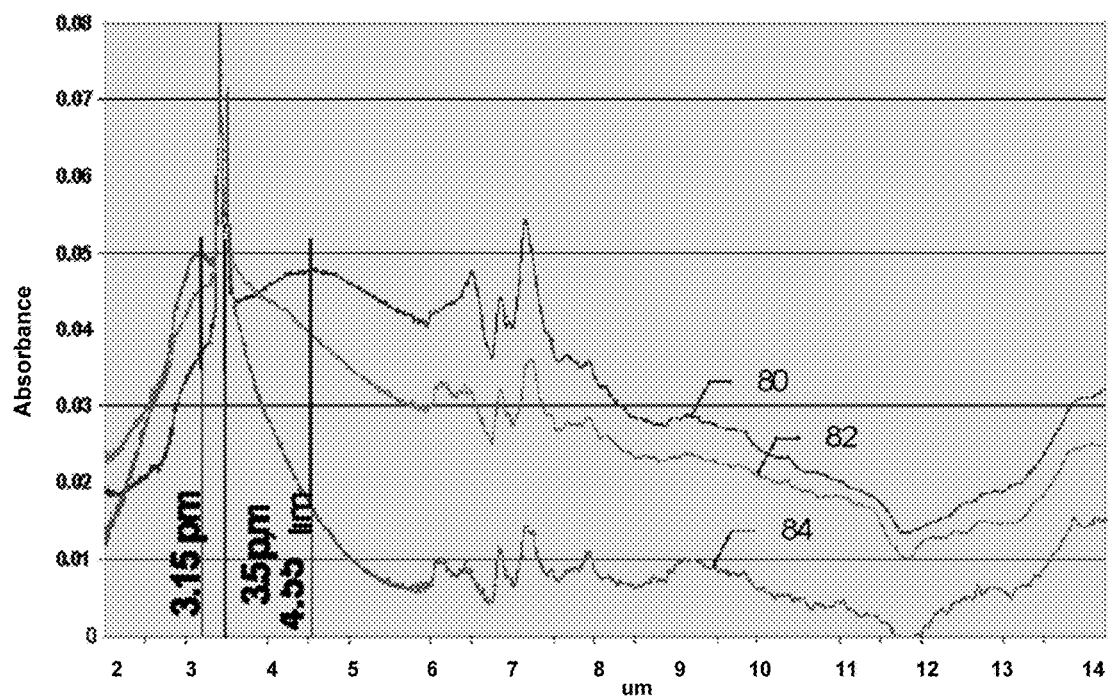
FIG. 8 is a graphical representation of the absorption spectrum of a SnTe nanomaterial in comparison to a $Pb_xSn_{1-x}Te$ nanomaterial having different ratios of Pb to Sn in accordance with one example embodiment of the present disclosure.

The exciton peak may also be repositioned by the absorbance spectrum 82 for controllably varying the Pb content in a reaction solution, such as from a 1:2 Pb:Sn synthesis solution mole ratio to a 1:12 Pb:Sn synthesis mole ratio or higher. As shown, for example in FIG. 8, the absorbance spectrum 82 for $Pb_xSn_{1-x}Te$ nanomaterial having a 1:8 Pb:Sn synthesis solution mole ratio has a shorter wavelength exciton peak than the absorbance spectrum 80 for $Pb_xSn_{1-x}Te$ nanomaterial made with a 1:4 Pb:Sn synthesis solution mole ratio, e.g., 3.5 microns in comparison to 4.55 microns. Additionally, the exciton peak of either type of $Pb_xSn_{1-x}Te$ nanomaterial has an exciton peak at a greater wavelength than that of a comparable SnTe material having an absorbance spectrum 84 with an exciton peak at 3.15 microns.

Figure 9:
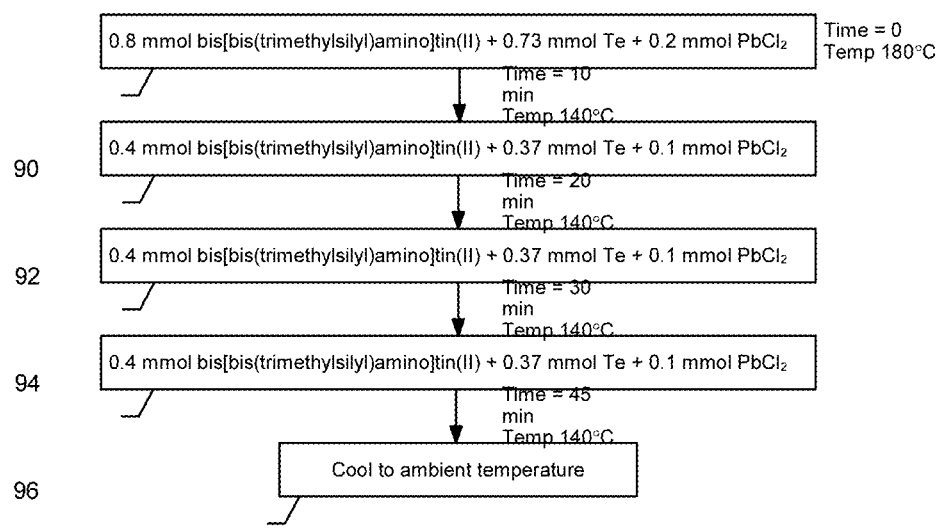
FIG. 9 is a flowchart illustrating the operations performed in accordance with a method of a further embodiment to the present disclosure.

As described above, the wavelength at which the peak absorption occurs may be increased by doping a SnTe nanomaterial with Pb either during the initial introduction of the Sn precursor solution and the Te solution are following the growth of the SnTe nanomaterial. However, even larger $Pb_xSn_{1-x}Te$ nanomaterials may be fabricated by introducing Pb at one or more instances throughout the manufacturing process, such as concurrent with a plurality of or each of the injections of additional amounts of the Sn precursor solution and the Te solution, as well as, in one embodiment, along with the initial combination of the Sn precursor solution and the Te solution. In some embodiments, a single additional injection of a Pb solution, the Sn precursor solution and the Te solution may be sufficient to obtain $Pb_xSn_{1-x}Te$ nanomaterial with a bandgap that is wide enough to absorb IR signals in the MWIR region and into the LWIR region. In other embodiments, however, the method may include a plurality of injections of the Pb solution, the Sn precursor solution and the Te solution at different points in time following the initial mixing in order to obtain $Pb_xSn_{1-x}Te$ nanomaterial with a sufficiently broad bandgap, such as a bandgap between 0 eV and 0.35 eV. Indeed, the plurality of injections of the Pb solution, the Sn precursor solution and the Te solution at different points in time in accordance with a method of one embodiment of the present invention cause a partial cation exchange of the Sn to Pb, as opposed to a total ion exchange, with the partial cation exchange leading to larger nanomaterials and, in turn, to a red shift of the band edge past the MWIR. In this regard, operation 90 of FIG. 9 illustrates a method in which the Sn precursor solution and the Te solution are initially mixed along with a Pb solution at time 0 and at a first elevated temperature, such as 180° C. In the illustrated embodiment, 0.8 mmol bis[bis(trimethyl-silyl)amino] tin (II) and 0.73 mmol Te and 0.2 mmol $PbCl_2$ are mixed at a first elevated temperature of 180°. The temperature of the mixture may then be reduced to a second elevated temperature, such as 140° C. The initial solution may be held at the second elevated temperature for a predefined period of time, such as ten minutes, prior to injecting additional amounts of the Sn precursor solution, the Te solution and the Pb solution, such as shown in operation 92 of FIG. 9. This process may be repeated at a plurality of different points in time, such as at 20 minutes and 30 minutes following the initial mixing as shown at operations 94 and 96, respectively. The final solution may then be maintained at the second elevated temperature for a predefined dwell time, such as 15 minutes in the illustrated embodiment. Thereafter, the solution may be cooled to ambient temperature as shown at operation 98 and the $Pb_xSn_{1-x}Te$ nanomaterial may then be precipitated, centrifuged and redissolved in a manner described above in order to extract the $Pb_xSn_{1-x}Te$ nanomaterials of a sufficient purity.

Figure 10:
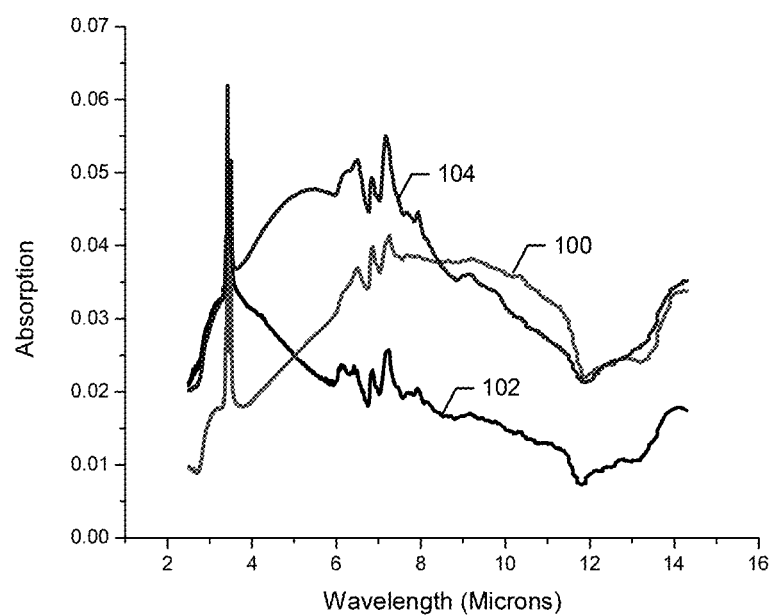
FIG. 10 is a graphical representation of the absorption spectrum of an $Pb_xSn_{1-x}Te$ nanomaterial having different ratios of Pb to Sn and different dwell times in accordance with one embodiment to the present disclosure.

As shown in FIG. 10, a graphical representation of the absorption spectrum 100 of a $Pb_xSn_{1-x}Te$ nanomaterial made in accordance with the foregoing process of FIG. 9 to have an exciton peak of at least 8 microns, such as at 8.8 microns, is provided. This absorption spectrum 100 may be compared to the absorption spectrum 102 and 104 of the $Pb_xSn_{1-x}Te$ nanomaterial made in a manner described in conjunction with FIG. 6 with a 1:8 Pb:Sn precursor ratio in regards to spectrum 102 and a 1:4 Pb:Sn precursor ratio in regards to spectrum 104 and having dwell times of 1.5 minutes and 11.5 minutes, respectively, and which have corresponding exciton peaks at 3.5 microns and 5.4 microns, respectively.

Figure 11:
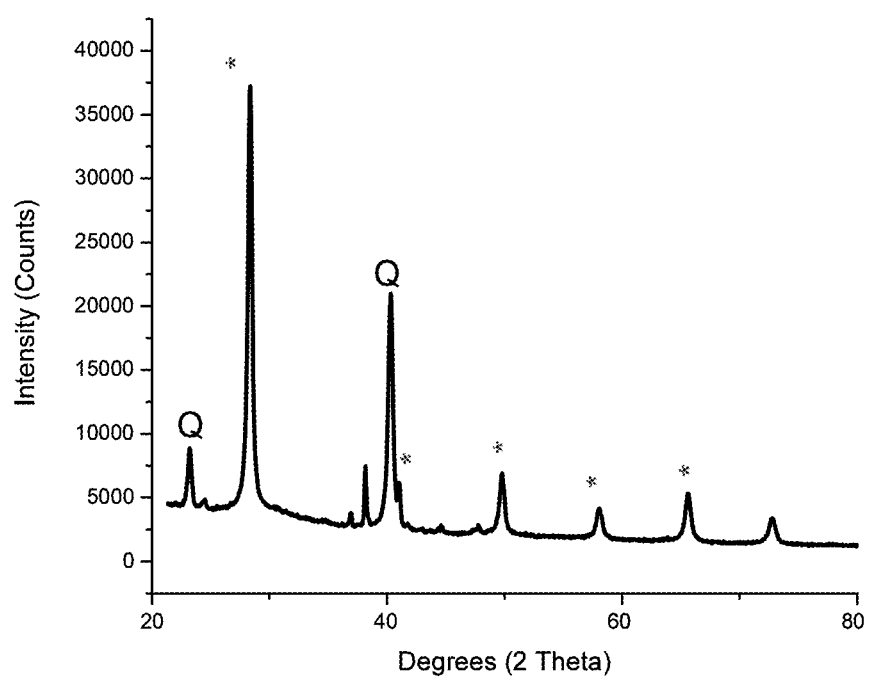
FIG. 11 is a graphical representation of an XRD spectrum of a SnTe nanomaterial doped with Pb in accordance with the embodiment of FIG. 8.

FIG. 11 provides the x-ray diffraction spectra of a SnTe nanomaterial that has been doped with Pb injected at a plurality of different points in time, such as shown in FIG. 9. In FIG. 11, the peaks designated with an asterisk (*) indicate reflections that match to a $Pb_{0.5}Sn_{0.5}Te$ reference pattern, and the peaks marked with a Q represent the reflections from the quartz sample holder. This x-ray diffraction data is indicative of the incorporation of Pb into the SnTe nanomaterial. Additionally, Scherrer broadening of the 23.2° 2θ diffraction peak gives an average crystallite size of 21.4 nm.

As described above, the band edge of the resulting SnTe nanomaterial may be tuned to various wavelengths within the IR spectrum, including throughout the MWIR region and, in some embodiments, into the LWIR region as a result of repeatedly injecting the feedstock at various points in time and by controlling the timing and temperature of the manufacturing process. As such, SnTe nanomaterials may be manufactured that are capable of absorbing different or additional regions within the IR spectrum, thereby facilitating development of additional IR sensors, detectors, coatings 12 or the like for various applications.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments described and that modifications and other embodiments are intended to be included within the scope of the appended claims. Although specific terms are employed herein, they are used in a generic and descriptive sense only and not for purposes of limitation.

That which is claimed:

1. A method of manufacturing a lead tin telluride ($Pb_xSn_{1-x}Te$) nanomaterial in which x has a value between 0.1 and 0.6, the method comprising:
   introducing a dried lead chloride solution into a container;
   adding a tin (Sn) precursor solution and a telluride (Te) solution to the dried lead chloride solution within the container to form a mixed solution; and
   maintaining the mixed solution at an elevated temperature for a period of time prior to cooling to an ambient temperature to form the $Pb_xSn_{1-x}Te$ nanomaterial.

2. A method according to claim 1 further comprising maintaining the dried lead chloride solution at a first elevated temperature while adding the Sn precursor solution and the Te solution, and wherein maintaining the mixed solution at an elevated temperature for a period of time prior to cooling comprises maintaining the mixed solution at a second elevated temperature, less than the first elevated temperature, for the period of time after adding the Sn precursor solution and the Te solution.

3. A method according to claim 1 wherein maintaining the mixed solution at an elevated temperature comprises maintaining the mixed solution at 120° C. or more for the period of time after adding the Sn precursor solution and the Te solution.

4. A method according to claim 1 wherein maintaining the mixed solution at an elevated temperature comprises maintaining the mixed solution at the elevated temperature for at least 90 seconds prior to cooling to the ambient temperature to form the $Pb_xSn_{1-x}Te$ nano material.

5. A method according to claim 1 further comprising:
   after maintaining the temperature of the mixed solution at the elevated temperature for the period of time and prior to cooling to the ambient temperature, repeatedly injecting additional amounts of the Sn precursor solution, the Te solution and a lead solution into the mixed solution at different points in time; and
   maintaining the mixed solution at an elevated temperature for a period of time following each injection of an additional amount of the Sn precursor solution, the Te solution and the lead solution into the mixed solution prior to a subsequent injection of an additional amount of the Sn precursor solution, the Te solution and the lead solution.

6. A method of manufacturing a lead tin telluride ($Pb_xSn_{1-x}Te$) nanomaterial in which x has a value between 0.1 and 0.6, the method comprising:
   introducing lead into a container;
   adding a tin (Sn) precursor solution and a telluride (Te) solution to the lead within the container to form a mixed solution;
   maintaining the mixed solution at an elevated temperature for a period of time prior to cooling to an ambient temperature to form the $Pb_xSn_{1-x}Te$ nanomaterial;
   after maintaining the temperature of the mixed solution at the elevated temperature for the period of time and prior to cooling to the ambient temperature, repeatedly injecting additional amounts of the Sn precursor solution, the Te solution and a lead solution into the mixed solution at different points in time; and
   maintaining the mixed solution at an elevated temperature for a period of time following each injection of an additional amount of the Sn precursor solution, the Te solution and the lead solution into the mixed solution prior to a subsequent injection of an additional amount of the Sn precursor solution, the Te solution and the lead solution.

7. A method according to claim 6 wherein introducing lead into the container comprises introducing a dried lead chloride solution into the container.

8. A method according to claim 6 further comprising maintaining the lead at a first elevated temperature while adding the Sn precursor solution and the Te solution, and wherein maintaining the mixed solution at an elevated temperature for a period of time prior to cooling comprises maintaining the mixed solution at a second elevated temperature, less than the first elevated temperature, for the period of time after adding the Sn precursor solution and the Te solution.

9. A method according to claim 6 wherein maintaining the mixed solution at an elevated temperature comprises maintaining the mixed solution at 120° C. or more for the period of time after adding the Sn precursor solution and the Te solution.

10. A method according to claim 6 wherein maintaining the mixed solution at an elevated temperature comprises maintaining the mixed solution at the elevated temperature for at least 90 seconds prior to cooling to the ambient temperature to form the $Pb_xSn_{1-x}Te$ nanomaterial.

* * * * *